(12) United States Patent
Seo et al.

(10) Patent No.: US 12,566,949 B2
(45) Date of Patent: Mar. 3, 2026

(54) TERNARY NEURAL NETWORK ACCELERATOR DEVICE AND METHOD OF OPERATING THE SAME

(71) Applicant: Inha University Research and Business Foundation, Incheon (KR)

(72) Inventors: Yeongkyo Seo, Bucheon-si (KR); Dae Woong Kwon, Seoul (KR)

(73) Assignee: Inha University Research and Business Foundation, Incheon (KR)

( * ) Notice: Subject to any disclaimer, the term of this patent is extended or adjusted under 35 U.S.C. 154(b) by 568 days.

(21) Appl. No.: 18/303,941

(22) Filed: Apr. 20, 2023

(65) Prior Publication Data

US 2024/0037381 A1      Feb. 1, 2024

(30) Foreign Application Priority Data

Jul. 28, 2022     (KR) ......................... 10-2022-0094203

(51) Int. Cl.
G06N 3/065          (2023.01)

(52) U.S. Cl.
CPC .................................... G06N 3/065 (2023.01)

(58) Field of Classification Search
CPC ............................... G06N 3/063; G06N 3/065
USPC .......................................................... 706/33
See application file for complete search history.

(56) References Cited

U.S. PATENT DOCUMENTS 11,126,402 B2     9/2021   Li
11,281,429 B2     3/2022   Jain et al.

11,289,171 B1     3/2022   Tran et al.
2020/0311523 A1*  10/2020  Hoang ..................... G06F 7/496
2021/0110244 A1*  4/2021   Hoang ..................... G06N 3/08
2022/0076737 A1*  3/2022   Cosemans ............... G06F 17/16
(Continued)

FOREIGN PATENT DOCUMENTS

KR          101928223 B1     12/2018
KR          102348169 B1     1/2022
KR         1020220044642 A   4/2022

OTHER PUBLICATIONS

Ashok Srivastava, Ternary input signal to binary bit output conversion CMOS integrated circuit design using neuron MOSFETs, Microsystem Technologies (2022) 28:101-108, Apr. 26, 2019, https://doi.org/10.1007/s00542-019-04440-0, Springer-Verlag GmbH Germany.

(Continued)

*Primary Examiner* — Hung T Vy
(74) *Attorney, Agent, or Firm* — WILLIAM PARK AND ASSOCIATES LTD.

(57) ABSTRACT

According to one aspect of the present invention, a ternary neural network accelerator device includes a first semiconductor device comprising a first source terminal, a first drain terminal, and a first gate terminal, a second semiconductor device comprising a second source terminal, a second drain terminal, and a second gate terminal, a first searching line connected to the first drain terminal, a second searching line connected to the second drain terminal, and a matching line commonly connected to the first source terminal and the second source terminal, wherein ternary weight and ternary input are each set by either of a first operation and a second operation and nine computation results are output through the matching line according to conditions of the ternary weight and ternary input.

10 Claims, 10 Drawing Sheets

(56) References Cited

U.S. PATENT DOCUMENTS

| | | | |
|---|---|---|---|
| 2022/0109444 A1 | 4/2022 | Kang et al. | |
| 2022/0293049 A1* | 9/2022 | Godo ..................... | H10K 59/13 |

OTHER PUBLICATIONS

Issues related to Samsung Electronics Co., Ltd.'s ternary semiconductor development (Jul. 26, 2019), https://m.blog.naver.com/kralla/221595794281.

Seongjae Heo et al., High-Speed Ternary CMOS Inverter by Monolithic Integration of NbO2 Threshold Switch with MOSFET, 2021 IEEE International Electron Devices Meeting (IEDM), pp. 681-684.

Subhendu Kumar Sahoo et al., High-Performance Ternary Adder Using CNTFET, IEEE Transactions on Nanotechnology, vol. 16, No. 3, May 2017, pp. 368-374.

* cited by examiner

|  | Erase | Program |
|---|---|---|
| SL$_1$ | V$_{ER}$ (erase) | GND (program) |
| SL$_2$ | GND (inhibit) | V$_{INH}$ (inhibit) |
| WL | GND | V$_{PRG}$ |
| ML | GND | GND |

FIG. 5A

|  | Weight = 0 | Weight = 1 | Weight = −1 |
|---|---|---|---|
| $V_{th1}$ | H−$V_{th}$ | H−$V_{th}$ | L−$V_{th}$ |
| $V_{th2}$ | H−$V_{th}$ | L−$V_{th}$ | H−$V_{th}$ |

FIG. 5B

|  | iFMAP=0 | iFMAP=1 | iFMAP=−1 |
|---|---|---|---|
| $SL_1$ | $V_{DD}/2$ | GND | $V_{DD}$ |
| $SL_2$ | $V_{DD}/2$ | $V_{DD}$ | GND |

FIG. 5C

|  | Act=0 | Act=1 | Act=−1 |
|---|---|---|---|
| ML | $V_{DD}/2$ | Charging | Discharging |

FIG.  6

| iFMAP | Weight | Calculation | Status | ML |
|-------|--------|-------------|--------|-----|
| −1 | −1 | 1 | Match | Charging |
| −1 | 0 | 0 | 0 | $V_{DD}/2$ |
| −1 | 1 | −1 | Mismatch | Discharging |
| 0 | −1 | 0 | 0 | $V_{DD}/2$ |
| 0 | 0 | 0 | 0 | $V_{DD}/2$ |
| 0 | 1 | 0 | 0 | $V_{DD}/2$ |
| 1 | −1 | −1 | Mismatch | Discharging |
| 1 | 0 | 0 | 0 | $V_{DD}/2$ |
| 1 | 1 | 1 | Match | Charging |

FIG. 8A

|  | iFMAP=0 | iFMAP=1 | iFMAP=−1 |
|---|---|---|---|
| $V_{th1}$ | H−$V_{th}$ | H−$V_{th}$ | L−$V_{th}$ |
| $V_{th2}$ | H−$V_{th}$ | L−$V_{th}$ | H−$V_{th}$ |

FIG. 8B

|  | Weight = 0 | Weight = 1 | Weight = −1 |
|---|---|---|---|
| $SL_1$ | $V_{DD}/2$ | GND | $V_{DD}$ |
| $SL_2$ | $V_{DD}/2$ | $V_{DD}$ | GND |

FIG. 8C

|  | Act=0 | Act=1 | Act=−1 |
|---|---|---|---|
| ML | $V_{DD}/2$ | Charging | Discharging |

TERNARY NEURAL NETWORK ACCELERATOR DEVICE AND METHOD OF OPERATING THE SAME

CROSS-REFERENCE TO RELATED APPLICATION(S)

This application claims the benefit under 35 U.S.C. § 119(a) of Korean Patent Application No. 10-2022-0094203, filed on Jul. 28, 2022, in the Korean Intellectual Property Office, the entire disclosure of which is incorporated herein by reference for all purposes.

BACKGROUND

1. Field

The following description relates to a semiconductor device, and more particularly, to a neural network accelerator device and a method of operating the same.

2. Description of Related Art

A central processing unit (CPU) of a computer is typically slow and insufficient in power. In contrast, a processor optimized to perform only a specific set of tasks can run quickly on low power and help to make certain algorithms run faster. Accordingly, many devices are custom built for specific categories and applications, and development of digital signal processors (DSPs), graphic processing units (GPUs), and neural network accelerators is ongoing.

In particular, in the era of artificial intelligence (AI), which is considered the core technology of the fourth industrial revolution, semiconductor devices, such as neural network accelerators, which are specialized for AI processing, such as deep learning, reasoning, etc. are essential. A neural network is a name for a set of algorithms that perform clustering and classification of data in machine learning applications. It has come to be named a neural network by comparing it to how neurons in the human brain work. A neural network accelerator is a processor that is optimized specifically to handle neural network workloads, and it is very efficient in collecting data and clustering and classifying the data at a very fast rate.

Most of the existing neural network accelerators are optimized for binary processing through lightweight networks. However, since these binary neural network accelerators process only binary data, there is a problem in that calculation accuracy is low.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

The following description relates to a ternary neural network accelerator device and a method of operating the same which can increase calculation accuracy through ternary data processing while offering advantages of a lightweight network due to a simple structure as in an existing binary neural network accelerator. However, the objects are exemplary, and the scope of the present invention is not limited thereto.

In one general aspect, there is provided a ternary neural network accelerator device including a first semiconductor device including a first source terminal, a first drain terminal, and a first gate terminal, and a second semiconductor device including a second source terminal, a second drain terminal, and a second gate terminal, a first searching line connected to the first drain terminal, a second searching line connected to the second drain terminal, and a matching line commonly connected to the first source terminal and the second source terminal, wherein ternary weight and ternary input are each set by either of a first operation in which a first threshold voltage of the first semiconductor device and a second threshold voltage of the second semiconductor device is changed to one of three states obtained by combining a relatively low threshold voltage and a relatively high threshold voltage and a second operation in which voltages to be applied to the first searching line and the second searching line are set to one of three combinations of a ground voltage, an operating voltage, and an intermediate operating voltage, and nine computation results are output through the matching line according to conditions of the ternary weight and ternary input.

According to the ternary neural network accelerator device, in the first operation, the three states may include a first state in which both the first threshold voltage and the second threshold voltage are high threshold voltages, a second state in which the first threshold voltage is a high threshold voltage and the second threshold voltage is a low threshold voltage, and a third state in which the first threshold voltage is a low threshold voltage and the second threshold voltage is a high threshold voltage.

According to the ternary neural network accelerator device, in the second operation, the three combinations may include a first combination by which the intermediate operating voltage is applied to both the first searching line and the second searching line, a second combination by which the ground voltage is applied to the first searching line and the operating voltage is applied to the second searching line, and a third combination by which the operating voltage is applied to the first searching line and the ground voltage is applied to the second searching line.

According to the ternary neural network accelerator device, the ternary weight may be set by the first operation and the ternary input may be set by the second operation.

According to the ternary neural network accelerator device, the ternary weight may be set by the second operation and the ternary input may be set by the first operation.

According to the ternary neural network accelerator device, the matching line may be precharged to the intermediate operating voltage.

According to the ternary neural network accelerator device, the first semiconductor device and the second semiconductor device may be ferroelectric field effect transistors (FeFET).

According to the ternary neural network accelerator device, in the first operation, the high threshold voltage is a threshold voltage in a programmed state of the FeFET and the low threshold voltage is a threshold voltage in an erase state of the FeFET.

According to the ternary neural network accelerator device, the first semiconductor device and the second semiconductor device may be flash memory devices.

In another general aspect, there is provided a method of operating a ternary neural network accelerator device, which may use the above-described ternary neural network accelerator device, including setting conditions of ternary weight and ternary input in the ternary neural network accelerator device and performing a ternary operation of outputting nine computation results through the matching line according to the conditions of the ternary weight and ternary input, wherein the ternary weight and the ternary input are each set by either of a first operation in which a first threshold voltage of the first semiconductor device and a second threshold voltage of the second semiconductor device is changed to one of three states obtained by combining a relatively low threshold voltage and a relatively high threshold voltage and a second operation in which voltages to be applied to the first searching line and the second searching line are set to one of three combinations of a ground voltage, an operating voltage, and an intermediate operating voltage.

Other features and aspects will be apparent from the following detailed description, the drawings, and the claims.

BRIEF DESCRIPTION OF THE DRAWINGS

FIGS. 5A to 5C and 6 are data tables showing ternary operating characteristics of the ternary neural network accelerator device of FIG. 1 according to an embodiment.

FIGS. 8A to 8C are data tables showing ternary operating characteristics of the ternary neural network accelerator device of FIG. 1 according to another embodiment.

Figure 1:
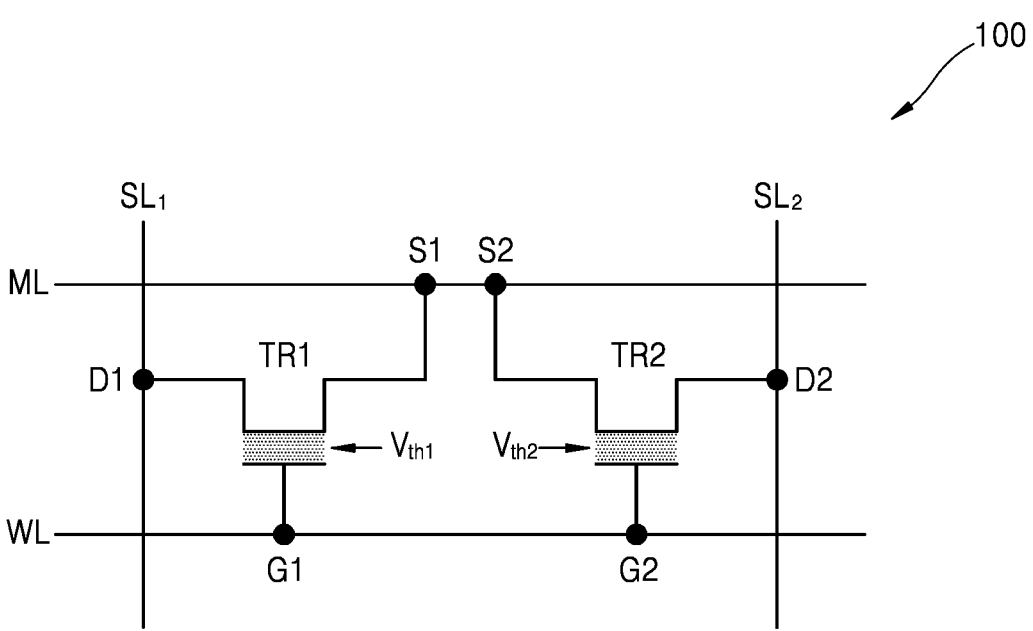
FIG. 1 is a circuit diagram illustrating a ternary neural network accelerator device according to an embodiment of the present invention.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

Hereinafter, preferred embodiments of the present invention will be described with reference to the accompanying drawings. However, the present invention is not limited to the following embodiments and may be embodied in various forms. These embodiments are provided so that this disclosure will be thorough and complete, and will fully convey the scope of the invention to those skilled in the art.

Unless otherwise defined, all terms used herein, including technical and scientific terms, have the same meaning as commonly understood by one of ordinary skill in the art to which the inventive concept belongs. Throughout the disclosure, like reference numerals refer to like elements. Also, thickness or sizes of at least some elements may be exaggerated or reduced in the drawings for convenience of explanation and clarity.

Hereinafter, exemplary embodiments of the present invention will be described in detail with reference to the accompanying drawings. The present disclosure may, however, be embodied in different forms and should not be construed as limited to the forms set forth herein. Rather, these forms are provided so that this disclosure will be thorough and complete, and will fully convey the scope of the present disclosure to those skilled in the art. Also, for convenience of description, the dimensions of elements are exaggerated or downscaled. The same reference numerals will be used to refer to the same or similar elements throughout the drawings.

Unless otherwise defined, all terms (including technical and scientific terms) used herein have the same meaning as generally understood by those skilled in the art. In the figures, the dimensions of layers and regions are exaggerated for clarity of illustration.

In the drawings, like reference numerals refer to like elements throughout. It will also be understood that when a component such as a layer or a region is referred to as being "on" another component, it can be directly on the other component, or intervening components may also be present. On the other hand, it will also be understood that when a component is referred to as being 'directly on' another component, intervening components may not be present.

FIG. 1 is a circuit diagram illustrating a ternary neural network accelerator device 100 according to an embodiment of the present invention.

Referring to FIG. 1, the ternary neural network accelerator device 100 may include a first semiconductor device TR1 and a second semiconductor device TR2. For example, the first semiconductor device TR1 may include a first source terminal S1, a first drain terminal D1, and a first gate terminal G1, and the second semiconductor device TR2 may include a second source terminal S2, a second drain terminal D2, and a second gate terminal G2.

Further, the ternary neural network accelerator device 100 may further include a first searching line $SL_1$, a second searching line $SL_2$, a word line WL and/or a matching line ML. For example, the first searching line $SL_1$ may be connected to the first drain terminal D1, the second searching line $SL_2$ may be connected to the second drain terminal D2, and the matching line ML may be commonly connected to the first source terminal S1 and the second source terminal $S_2$.

Figure 2:
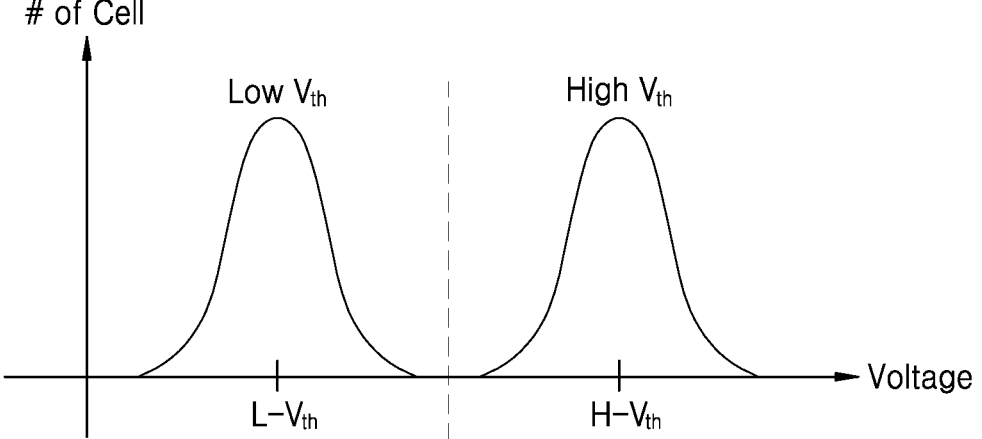
FIG. 2 is a graph showing threshold voltage characteristics of the ternary neural network accelerator device of FIG. 1.

The first semiconductor device TR1 may have a first threshold voltage $V_{th1}$ and the second semiconductor device TR2 may have a second threshold voltage $V_{th2}$. As shown in FIG. 2, the first threshold voltage $V_{th1}$ of the first semiconductor device TR1 and the second threshold voltage $V_{th2}$ of the second semiconductor device TR2 may have a dual state, for example, a relatively low threshold voltage L-$V_{th}$ and a relatively high threshold voltage H-$V_{th}$.

Here, the low threshold voltage L-$V_{th}$ and the high threshold voltage H-$V_{th}$ may be determined by comparing their relative magnitudes between the two. For example, each of the first semiconductor device TR1 and the second semiconductor device TR2 may have at least two states having different threshold voltages, and the low threshold voltage L-$V_{th}$ may refer to the lower threshold voltage between them and the high threshold voltage H-$V_{th}$ may refer to the relatively high threshold voltage between them.

The first semiconductor device TR1 and the second semiconductor device TR2 may be memory devices capable of storing data therein. For example, the first semiconductor device TR1 and the second semiconductor device TR2 may include a ferroelectric field effect transistor (FeFET) or a flash memory device.

In some embodiments, the high threshold voltage H-$V_{th}$ is a threshold voltage in a programmed state of a FeFET or a flash memory device, and a low threshold voltage L-$V_{th}$ is a threshold voltage in an erase state of the FeFET or the flash memory device.

Hereinafter, conditions of the program state and the erase state in the ternary neural network accelerator device 100 will be illustratively described.

Figures 3, 4:
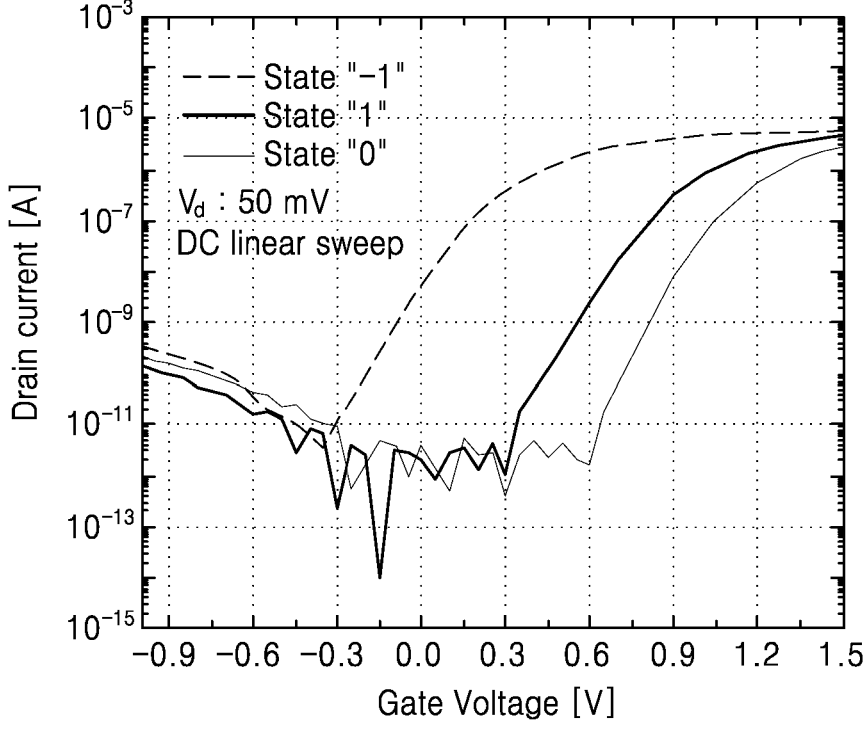
FIG. 3 is a data table showing erase and program operating conditions of semiconductor devices in the ternary neural network accelerator device of FIG. 1.
FIG. 4 is a V-I graph showing changes in threshold voltage according to the state of the semiconductor devices in the ternary neural network accelerator device of FIG. 1.

FIG. 3 is a data table showing erase and program operation conditions of semiconductor devices in the ternary neural network accelerator device 100 of FIG. 1, and FIG. 4 is a V-I graph showing changes in threshold voltage according to the state of the semiconductor devices in the ternary neural network accelerator device of FIG. 1.

Referring to FIG. 3, for a program operation of the first semiconductor device TR1, the first searching line $SL_1$ may be connected to a ground GND, a program inhibition voltage VINH may be applied to the second searching line $SL_2$, a program voltage $V_{PRG}$ may be applied to the word line WL, and the matching line may be connected to the ground GND. For example, the program inhibition voltage VINH and the program voltage $V_{PRG}$ may be the same as one operating voltage $V_{DD}$. Accordingly, during the program operation of the first semiconductor device TR1, the program operation of the second semiconductor device TR2 may be prevented.

Meanwhile, for the erase operation of the first semiconductor device TR1, an erase voltage $V_{ER}$ may be applied to the first searching line $SL_1$, an erase inhibition voltage $V_{ER}$ may be applied to the second searching line $SL_2$, and the word line WL and the matching line may be connected to the ground. For example, the erase inhibition voltage $V_{ER}$ may be a ground voltage, and the erase voltage $V_{ER}$ may be an operating voltage $V_{DD}$. Accordingly, during the erase operation of the second semiconductor device TR2, the erase operation of the first semiconductor device TR1 may be prevented.

Referring to FIG. 4, it can be seen that the threshold voltage varies according to the data state of the first semiconductor device TR1 or the second semiconductor element TR2.

Hereinafter, a ternary operation using the ternary neural network accelerator device 100 will be described.

According to the ternary operation of the ternary neural network accelerator device 100, conditions for ternary weight and ternary input are set, and nine computation results may be output through the matching line ML according to the conditions of the ternary weights and ternary inputs.

For example, the ternary weight and ternary input for ternary processing may each be set by either of a first operation in which the first threshold voltage $V_{th1}$ of the first semiconductor device TR1 and the second threshold voltage $V_{th2}$ of the second semiconductor device TR2 are changed to one of three states obtained by combining a relatively low threshold voltage L-$V_{th}$ and a relatively high threshold voltage H-$V_{th}$ and a second operation in which voltages to be applied to the first searching line $SL_1$ and the second searching line $SL_2$ are set to any one of three combinations of a ground voltage GND, an operating voltage $V_{DD}$, and an intermediate operating voltage $V_{DD}/2$.

In some embodiments, the three states in the first operation may include a first state in which both the first threshold voltage $V_{th1}$ and the second threshold voltage $V_{th2}$ are high threshold voltages H-$V_{th}$, a second state in which the first threshold voltage $V_{th1}$ is a high threshold voltage H-$V_{th}$ and the second threshold voltage $V_{th2}$ is a low threshold voltage L-$V_{th}$, and a third state in which the first threshold voltage $V_{th1}$ is a low threshold voltage L-$V_{th}$ and the second threshold voltage $V_{th2}$ is a high threshold voltage H-$V_{th}$.

In some embodiments, the three combinations in the second operation may include a first combination in which the intermediate operating voltage $V_{DD}/2$ is applied to both the first and second searching lines $SL_1$ and $SL_2$, a second combination in which the ground voltage GND is applied to the first searching line $SL_1$ and the operating voltage $V_{DD}$ is applied to the second searching line $SL_2$, and a third combination in which the operating voltage $V_{DD}$ is applied to the first searching line $SL_1$ and the ground voltage GND is applied to the second searching line $SL_2$.

In some embodiments, the matching line ML may be precharged to the intermediate operating voltage $V_{DD}/2$. Therefore, in a case where both the first semiconductor device TR1 and the second semiconductor device TR2 are turned off, the matching line ML may output the precharged intermediate operating voltage $V_{DD}/2$ intact. On the other hand, in a case where both the first semiconductor device TR1 and the second semiconductor device TR2 are turned on, charging or discharging current flows and the voltage of the first searching line $SL_1$ or the second searching line $SL_2$ may be output.

First, an embodiment in which the ternary weight is set by the first operation and the ternary input is set by the second operation will be described.

FIGS. 5A to 5C and 6 are data tables showing ternary operating characteristics of the ternary neural network accelerator device 100 of FIG. 1 according to an embodiment.

s Referring to FIG. 5A, the ternary weight may be set by adjusting the threshold voltages of the first semiconductor device TR1 and the second semiconductor device TR2. For example, during the first operation for setting the ternary weight, the three states may include a first state (weight=0), a second state (weight=1), and a third state (weight=−1). Adjustment of the threshold voltages of the first semiconductor device TR1 and the second semiconductor device TR2 requires presetting, but since the ternary weight is not frequently changed, once set, it may be maintained for a long time.

Referring to FIG. 5B, the ternary inputs may be set by combining the voltages applied to the first searching line $SL_1$ and the second searching line $SL_2$. For example, the three combinations may include a first combination (iFMAP=0), a second combination (iFMAP=1), and a third combination (iFMAP=−1).

Referring to FIG. 5C, outputs through the matching line ML may represent three states. For example, a first state (Act=0) may by represented by an intermediate operating voltage $V_{DD}/2$, a second state (Act=1) may be represented by a charging state, and a third state (Act=−1) may be represented by a discharging state.

Referring to FIG. 6, nine computation results may be output according to the conditions of the ternary weight and ternary input iFMAP. The outputs may largely include a match state indicating a charging state, a mismatch state indicating a discharging state of the matching line ML, and a zero (0) state in which the matching line ML has the intermediate operating voltage $V_{DD}/2$.

Figure 7A:
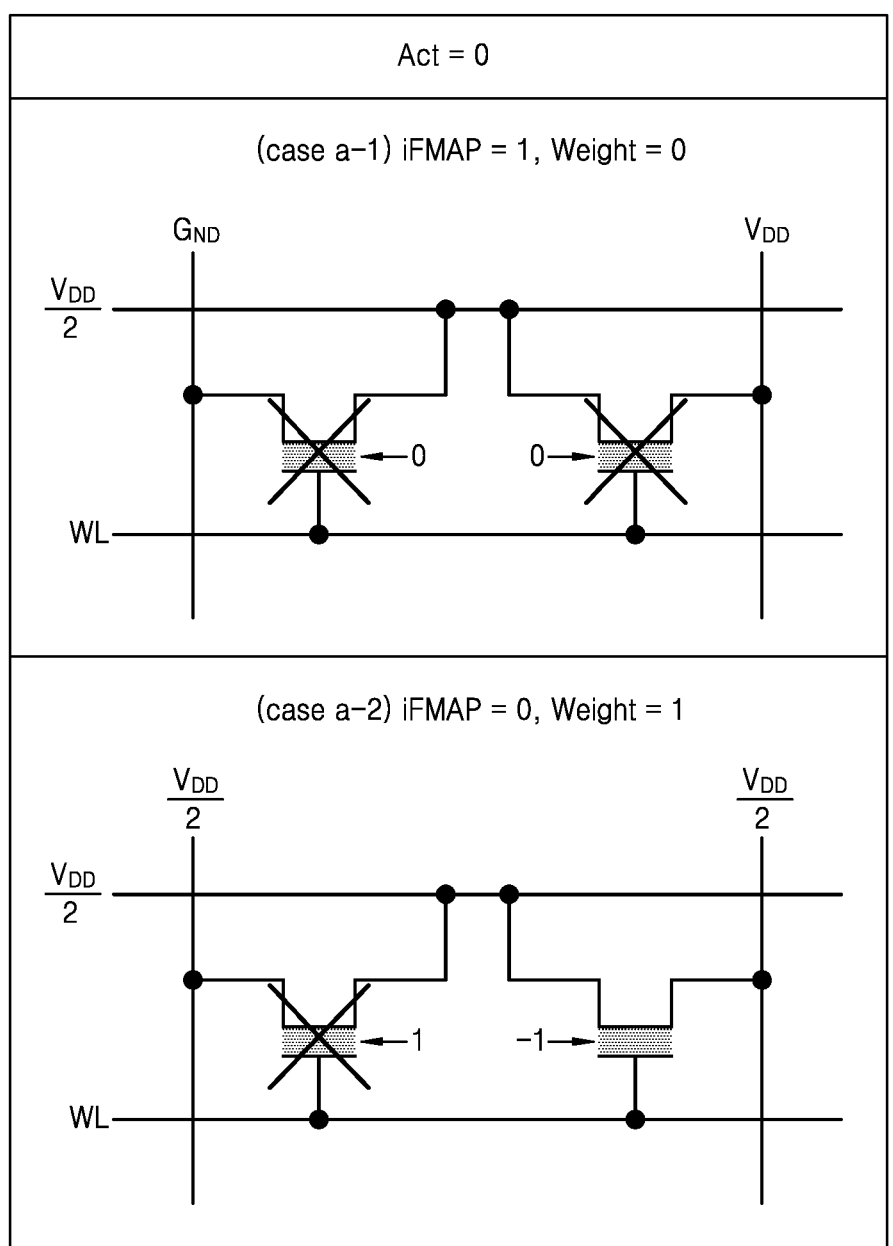
FIGS. 7A to 7C are circuit diagrams illustrating the ternary operation of the ternary neural network accelerator device of FIG. 1.
Figure 7B:
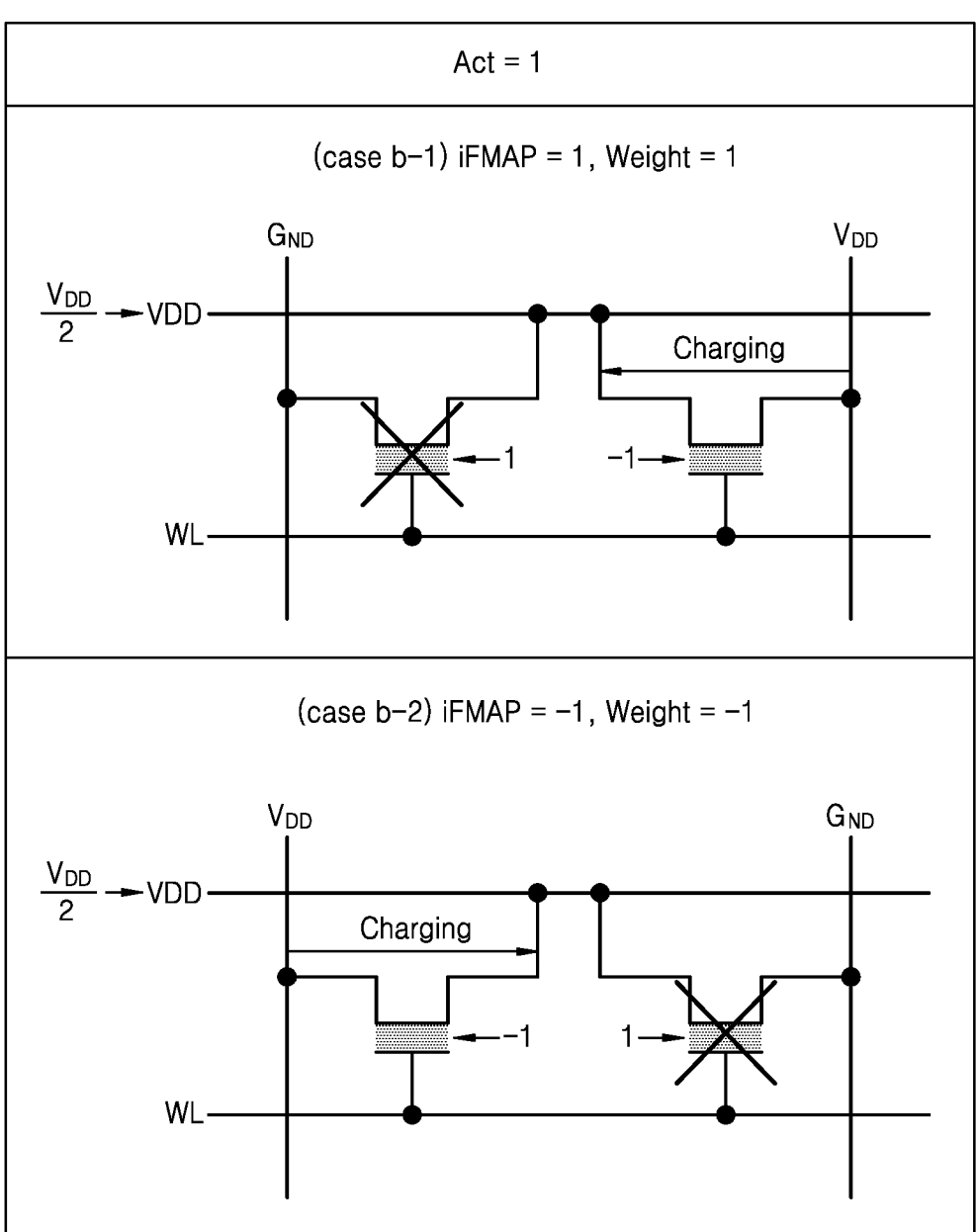
Figure 7C:
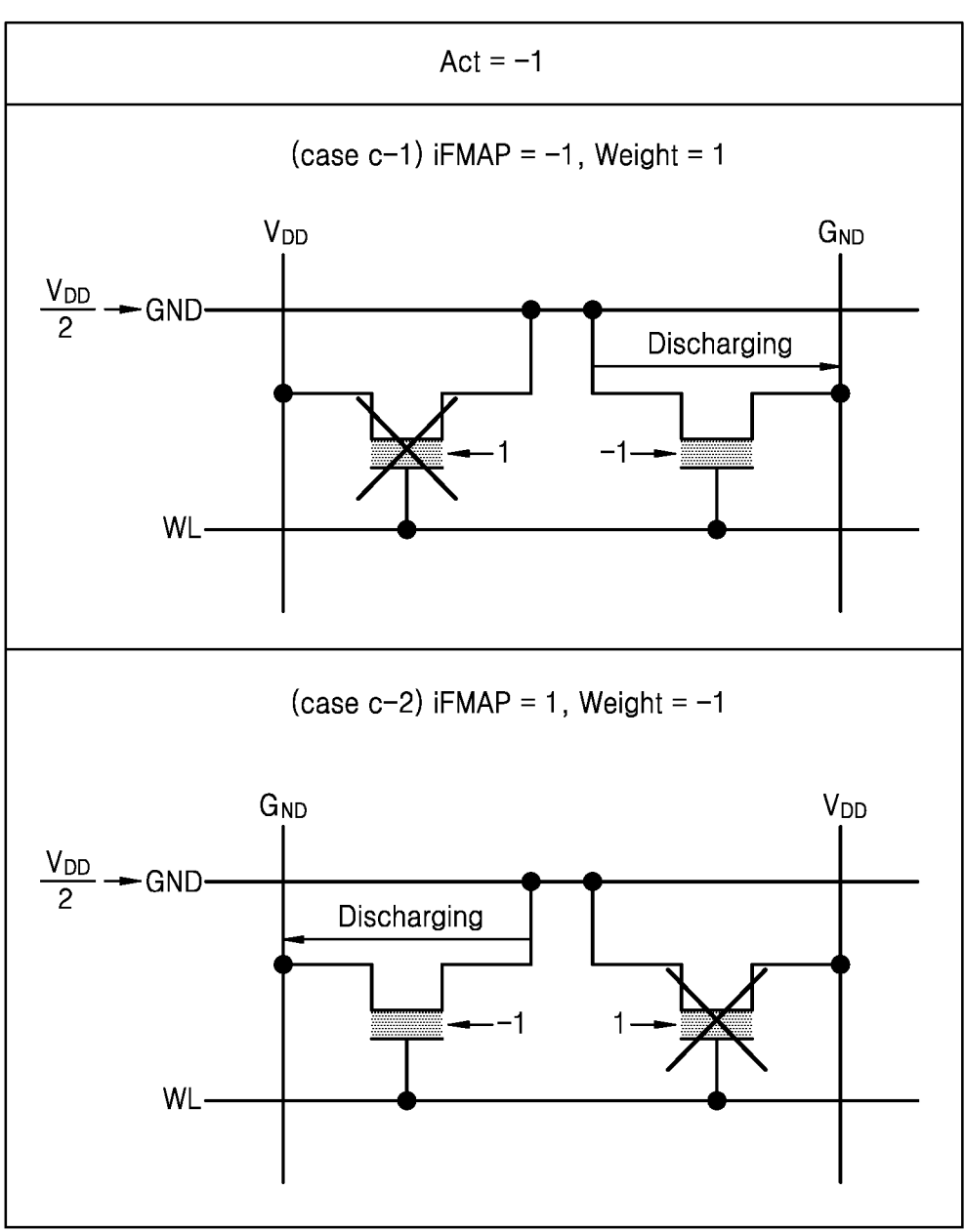

FIGS. 7A to 7C are circuit diagrams illustrating the ternary operation of the ternary neural network accelerator device of FIG. 1.

Referring to FIG. 7A, when the ternary weight is in the first state (Weight=0) (case a-1) or the ternary input iFMAP is of the first combination (iFMAP=0) (case a-2), a zero (0) state in which the matching line ML has an intermediate operating voltage $V_{DD}/2$ may be output.

Referring to FIG. 7B, when the ternary weight is in the second state (Weight=1) and the ternary input iFMAP is of the second combination (iFMAP=1) (case b-1) or when the ternary weight is in the third state (Weight=−1) and the ternary input iFMAP is of the third combination (iFMAP=−1) (case b-2), a match state indicating the charging state of the matching line ML may be output.

Referring to FIG. 7C, when the ternary weight is in the third state (Weight=−1) and the ternary input iFMAP is of the second combination (iFMAP=1) (case c-1) or when the ternary weight is in the second state (Weight=1) and the ternary input iFMAP is of the third combination (iFMAP=−1) (case c-2), a mismatch state indicating the discharging state of the matching line ML may be output.

Meanwhile, in some embodiments, the ternary weight may be set by the second operation, and the ternary input may be set by the first operation.

FIGS. 8A to 8C are data tables showing ternary operating characteristics of the ternary neural network accelerator device 100 of FIG. 1 according to another embodiment.

Referring to FIG. 8A, ternary input may be set by adjusting threshold voltages of the first semiconductor device TR1 and the second semiconductor device TR2. For example, during the first operation for setting the ternary weight, three states may include a first state (iFMAP=0), a second state (iFMAP=1), and a third state (iFMAP=−1).

Referring to FIG. 8B, the ternary weight may be set by combining voltages applied to the first searching line $SL_1$ and the second searching line $SL_2$. For example, three combinations may include a first combination (Weight=0), a second combination (Weight=1), and a third combination (Weight=−1).

Referring to FIG. 8C, outputs through the matching line ML may represent three states. For example, a first state (Act=0) may be represented by an intermediate operating voltage $V_{DD}/2$, a second state (Act=1) may be represented by a charging state, and a third state (Act=−1) may be represented by a discharging state.

In the present embodiment, as described with reference to FIG. 6, nine computation results may be output by combining the ternary input and the ternary weight.

Figure 9:
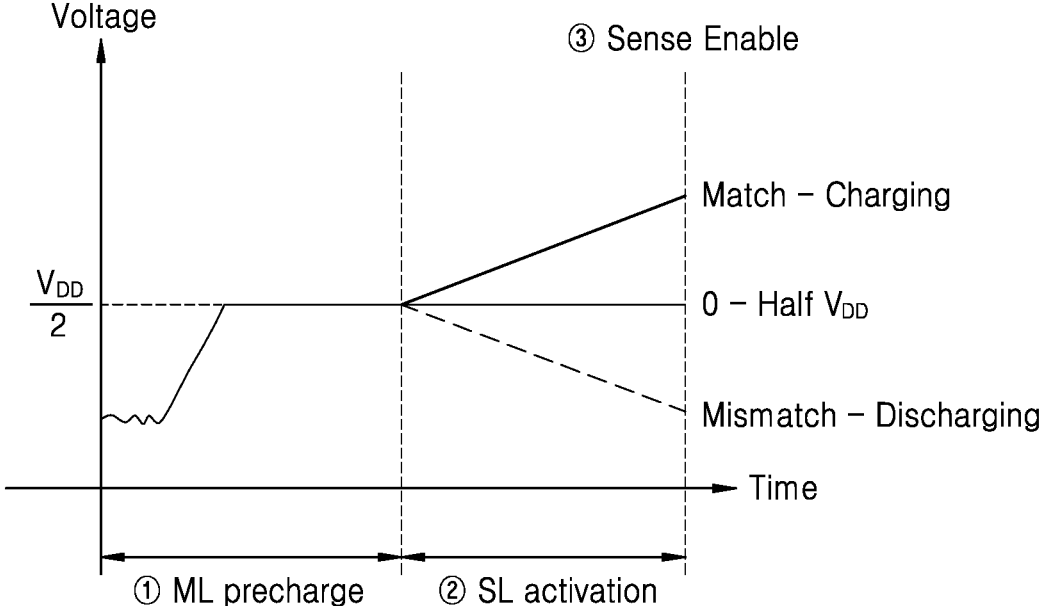
FIG. 9 is a graph showing ternary operating characteristics of the ternary neural network accelerator device of FIG. 1.

FIG. 9 is a graph showing ternary operating characteristics of the ternary neural network accelerator device 100 of FIG. 1.

Referring to FIG. 9, after the matching line ML is precharged to the intermediate operating voltage $V_{DD}/2$ (ML precharge), the first and second searching lines are activated so that a zero (0) state in which the matching line ML has the intermediate operating voltage $V_{DD}/2$, a match state indicating a charging state of the matching line ML, and a mismatch state indicating a discharging state of the matching line ML may be detected.

Figure 10:
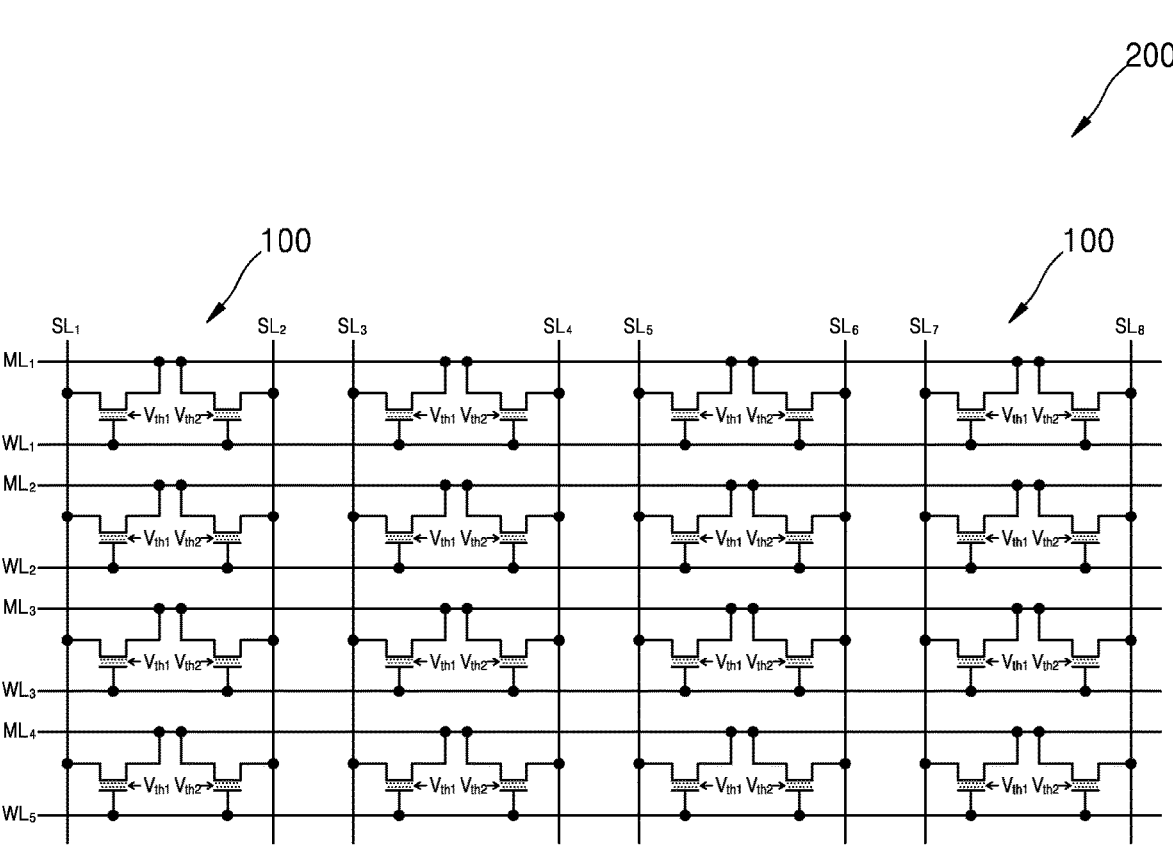
FIG. 10 is a circuit diagram illustrating a ternary accelerator device according to another embodiment of the present invention.

FIG. 10 is a circuit diagram illustrating a ternary accelerator device 200 according to another embodiment of the present invention.

Referring to FIG. 10, the ternary accelerator device 200 may have a two-dimensional structure in which the ternary accelerator devices 100 shown in FIG. 1, each of which forms a unit cell, are arranged in a 4×4 array. For example, in the ternary accelerator device 200, a plurality of searching lines $SL_1$ to $SL_8$ may be arranged in a plurality of columns, a plurality of matching lines $ML_1$ to $ML_4$ and a plurality of word lines $WL_1$ to $WL_4$ may be arranged in a plurality of rows, and each unit cell may be connected to one of the matching lines $ML_1$ to $ML_4$ and one of the word lines $WL_1$ to $WL_4$ between two adjacent searching lines $SL_1$ to $SL_8$. The operation of the ternary accelerator device 200 may be understood with reference to the operation of the ternary accelerator device 100 described above.

The number of unit cells in the ternary accelerator device 200 may be selected appropriately and does not limit the scope of this embodiment.

According to the above-described ternary accelerator devices 100 and 200, calculation accuracy may be increased through ternary data processing while offering advantages of a lightweight network due to a simple structure as in the existing binary neural network accelerator.

According to the ternary neural network accelerator device and a method of operating the same in accordance with embodiments of the present invention ad described above, it is possible to increase operation accuracy through ternary data processing while offering advantages of a lightweight network due to a simple structure as in the existing binary neural network accelerator. However, the scope of the present disclosure is not limited by the above effect.

Although the exemplary embodiments of the present invention have been described, it is understood that the present invention should not be limited to these forms but various changes and modifications can be made by one ordinary skilled in the art within the spirit and scope of the present invention. Hence, the real protective scope of the present invention shall be determined by the technical scope of the accompanying claims.

What is claimed is:

1. A ternary neural network accelerator device, comprising:

a first semiconductor device comprising a first source terminal, a first drain terminal, and a first gate terminal;

a second semiconductor device comprising a second source terminal, a second drain terminal, and a second gate terminal;

a first searching line connected to the first drain terminal;

a second searching line connected to the second drain terminal;

and a matching line commonly connected to the first source terminal and the second source terminal, wherein ternary weight and ternary input are each set by either of a first operation in which a first threshold voltage of the first semiconductor device and a second threshold voltage of the second semiconductor device is changed to one of three states obtained by combining a relatively low threshold voltage and a relatively high threshold voltage and a second operation in which voltages to be applied to the first searching line and the second searching line are set to one of three combinations of a ground voltage, an operating voltage, and an intermediate operating voltage, and nine computation results are output through the matching line according to conditions of the ternary weight and the ternary input.

2. The ternary neural network accelerator device of claim 1, wherein in the first operation, the three states comprises a first state in which both the first threshold voltage and the second threshold voltage are high threshold voltages; a second state in which the first threshold voltage is a high threshold voltage and the second threshold voltage is a low threshold voltage; and a third state in which the first threshold voltage is a low threshold voltage and the second threshold voltage is a high threshold voltage.

3. The ternary neural network accelerator device of claim 1, wherein in the second operation, the three combinations comprises a first combination by which the intermediate operating voltage is applied to both the first searching line and the second searching line; a second combination by which the ground voltage is applied to the first searching line and the operating voltage is applied to the second searching line; and a third combination by which the operating voltage is applied to the first searching line and the ground voltage is applied to the second searching line.

4. The ternary neural network accelerator device of claim 1, wherein the ternary weight is set by the first operation and the ternary input is set by the second operation.

5. The ternary neural network accelerator device of claim 1, wherein the ternary weight is set by the second operation and the ternary input is set by the first operation.

6. The ternary neural network accelerator device of claim 1, wherein the matching line is precharged to the intermediate operating voltage.

7. The ternary neural network accelerator device of claim 1, wherein the first semiconductor device and the second semiconductor device are ferroelectric field effect transistors (FeFET).

8. The ternary neural network accelerator device of claim 7, wherein in the first operation, the high threshold voltage is a threshold voltage in a programmed state of the FeFET and the low threshold voltage is a threshold voltage in an erase state of the FeFET.

9. The ternary neural network accelerator device of claim 1, wherein the first semiconductor device and the second semiconductor device are flash memory devices.

10. A method of operating a ternary neural network accelerator device which comprises a first semiconductor device comprising a first source terminal, a first drain terminal, and a first gate terminal; a second semiconductor device comprising a second source terminal, a second drain terminal, and a second gate terminal; a first searching line connected to the first drain terminal; a second searching line connected to the second drain terminal; and a matching line commonly connected to the first source terminal and the second source terminal, the method comprising:

setting conditions of ternary weight and ternary input in the ternary neural network accelerator device; and performing a ternary operation of outputting nine computation results through the matching line according to the conditions of the ternary weight and ternary input, wherein the ternary weight and the ternary input are each set by either of a first operation in which a first threshold voltage of the first semiconductor device and a second threshold voltage of the second semiconductor device is changed to one of three states obtained by combining a relatively low threshold voltage and a relatively high threshold voltage and a second operation in which voltages to be applied to the first searching line and the second searching line are set to one of three combinations of a ground voltage, an operating voltage, and an intermediate operating voltage.

* * * * *